(12) United States Patent
Johannesson et al.

(10) Patent No.: US 7,084,989 B2
(45) Date of Patent: Aug. 1, 2006

(54) MEASURING APPARATUS AND METHOD IN A DISTRIBUTION SYSTEM

(75) Inventors: Mattias Johannesson, Linkoping (SE);
Fredrik Nilsson, Ljungsbro (SE);
Karl-Gunnar Gunnarsson,
Woodenville, WA (US)

(73) Assignee: Sick IVP Aktiebolag, Linkoeping (SE)

( * ) Notice: Subject to any disclaimer, the term of this patent is extended or adjusted under 35 U.S.C. 154(b) by 320 days.

(21) Appl. No.: 10/827,896

(22) Filed: Apr. 19, 2004

(65) Prior Publication Data
US 2005/0231734 A1    Oct. 20, 2005

(51) Int. Cl.
*G01B 11/24* (2006.01)
*G01B 11/14* (2006.01)

(52) U.S. Cl. ............... 356/601; 356/608; 356/614; 356/621; 356/622

(58) Field of Classification Search ............ 356/601, 356/607, 608, 614, 622, 631; 250/559.24, 250/559.26, 559.29, 559.31, 559.32
See application file for complete search history.

(56) References Cited

U.S. PATENT DOCUMENTS

| | | | |
|---|---|---|---|
| 4,498,778 A | 2/1985 | White | |
| 4,741,621 A | 5/1988 | Taft et al. | |
| 4,929,843 A | 5/1990 | Chmielewski et al. | |
| 5,461,478 A | 10/1995 | Sakakibara et al. | |
| 5,900,611 A | 5/1999 | Hecht | |
| 6,102,291 A * | 8/2000 | Mazzone | 235/462.01 |
| 6,369,401 B1 | 4/2002 | Lee | |
| 6,542,249 B1 * | 4/2003 | Kofman et al. | 356/601 |
| 6,641,042 B1 * | 11/2003 | Pierenkemper et al. | 235/462.01 |
| 6,704,114 B1 * | 3/2004 | Poechmuller | 356/601 |
| 6,724,490 B1 * | 4/2004 | Ono | 356/614 |

FOREIGN PATENT DOCUMENTS

| | | |
|---|---|---|
| DE | 3528047 C2 | 2/1987 |
| EP | 1265174 A1 | 12/2002 |
| EP | 1269114 B1 | 4/2004 |

* cited by examiner

*Primary Examiner*—Gregory J. Toatley, Jr.
*Assistant Examiner*—Roy M. Punnoose
(74) *Attorney, Agent, or Firm*—Townsend and Townsend and Crew

(57) ABSTRACT

The present invention relates to the field of measuring apparatuses in distribution systems allowing for measuring presence, position and/or shape of an object placed on a carrier and a method for such measuring. The measuring apparatus comprises at least one light source arranged to illuminate said object and said carrier with incident light; at least one sensor placed on a predetermined distance from said at least one light source and arranged to repeatedly measure said object and said carrier by detecting reflected light from said object and said carrier when said carrier is moved in said direction of movement and to convert the detected light into electrical signals; an image-processing unit arranged to use the electrical signals and obtain a three-dimensional sub-image of each of the measurements of said object and said carrier and to obtain a three-dimensional image of said object and said carrier from one or more of said obtained sub-images; and, a calculating unit arranged to determine the presence, position and/or shape of said object on said carrier from said three-dimensional image.

43 Claims, 9 Drawing Sheets

MEASURING APPARATUS AND METHOD IN A DISTRIBUTION SYSTEM

BACKGROUND OF THE INVENTION

1. Field of the Invention

The present invention relates to the field of measuring apparatuses in distribution systems, and particularly to a measuring apparatus allowing for measuring presence and position of an object placed on a carrier as well as a method for such measuring.

2. Description of the Related Art

In large sorting and distribution systems a large number of objects are handled automatically, e.g. sorting of packages in postage systems or handling of parts in re-distribution centrals. Typically the objects are loaded onto a carrier which transports the objects to a determined location where they are loaded off the carrier. In these types of systems it is important to know the presence, position and shape of objects on the carriers. The presence is required to determine if any objects can be placed onto the carrier prior to loading the object on the carrier or to detect that the object really is placed on a specific carrier. Position is required to adjust cross-belt carrier position to keep the object safely within the carrier or to calculate the optimum extraction position. Two-dimensional and/or three-dimensional shape is required in e.g. a package distribution system, where there is a need to calculate volume based freight costs and/or optimum loading on e.g. a truck.

The objects to be handled in such sorting and distribution systems can be of very different sizes and materials, and may be wrapped in clear plastics etc. This makes the detection/measuring of presence, position and shape of objects difficult with simple techniques.

A commonly used technique for sensing that an object is present on a carrier is the use of a simple light switch, such as a photo sensor, which can detect presence and position information in at least one dimension along the carriers' direction of movement. However, a problem associated with this technique is that it is nearly impossible for the sensor to sense an object which is low in relation to the vertical vibration of the carriers and the technique can only be used for systems that use carriers which are flat-shaped. Also, the sensor is not able to detect the position of the object in a transversal direction across the carrier.

Another commonly used technique for sensing that an object is present on a carrier is conventional two-dimensional (2D) image processing. This is made with a standard two-dimensional camera taking a snapshot of the carrier, or a line-scan sensor acquiring the 2D image information as the carrier moves through the Field-of-View (FoV). If the carriers are free from disturbing artifacts, such as paint or stickers, two-dimensional image processing can typically extract 2D-position and shape of objects. However, typically the carriers will be stained with e.g. stickers after being used for a while, which makes it hard to extract the needed information using 2D image processing. Additionally, using 2D image processing is very hard when the color of the object is similar to the color of the background, i.e. the carrier.

Still another used technique for sensing that an object is present on a carrier is a three-dimensional (3D) image processing. When using 3D data most objects are detected securely. However, for certain materials the 3D image acquisition might give no secure 3D information, such if the objects are very reflective, very dark or very low in height.

Many of the systems existing today, described above, used for these types of measurements of objects are only capable of handling carriers having a flat form but often there is a requirement for the use of carriers with different shapes, for example flat carriers with edges and bowl-shaped carriers. It is also desirable to be able to do the measuring of the objects even if the carrier is vibrating or if it for any reason is tilted with reference to the nominal alignment.

One prior art approach is disclosed in U.S. Pat. No. 6,102,291, in which an apparatus detects the presence and position of an object on a bearing surface of a moving supply plane. The measuring is made with a modulated light laser scanner that is placed above the supply plane. The apparatus is first of all used for the reading of optical codes (bar codes) positioned on the surface of the object.

However, in this prior art approach the measuring is done with a modulated time-of-flight laser scanner. The modulated light laser scanner has movable parts which causes wear and it also requires regular maintenance. Also, when a high level of 3D accuracy is needed the use of a modulated light laser scanner becomes very expensive.

Although the known prior art solves some of the problems described above it does not specifically address the problem of non-flat carriers and the problem of providing measurement for very small objects or objects having similar color as the background color.

Thus, an object of the present invention is to provide an improved apparatus and method that enables for the use of non-flat carriers and for the measuring of very small objects or objects having similar color as the background color,

SUMMARY OF THE INVENTION

An object of the present invention is to provide an improved method for measuring the presence and/or position of an object placed on a carrier moving in a predetermined direction of movement in a distribution system.

This object is achieved through providing a method comprising the steps of:

illuminating said object and said carrier with incident light by at least one light source;

repeatedly measuring said object and said carrier by detecting reflected light from said object and said carrier when said carrier is moved in said direction of movement using at least one sensor, which is placed with a predetermined distance from said at least one light source;

converting the detected light into electrical signals;

obtaining a three-dimensional sub-image of said object and said carrier from each measurement of said object and said carrier using said electrical signals;

obtaining a three-dimensional image of said object and said carrier from one or more of said obtained sub-images; and determining the presence and/or position of said object on said carrier from said three-dimensional image.

A further object of the present invention is to provide an improved apparatus allowing for measuring the presence and/or position of an object placed on a carrier moving in a predetermined direction of movement in a distribution system.

This object is achieved through providing an apparatus which comprises:

at least one light source arranged to illuminate said object and said carrier with incident light;

at least one sensor placed on a predetermined distance from said at least one light source and arranged to repeatedly measure said object and said carrier by detecting reflected light from said object and said carrier when said carrier is moved in said direction of movement and to convert the detected light into electrical signals;

an image-processing unit arranged to use the electrical signals and obtain a three-dimensional sub-image of each of the measurements of said object and said carrier and to obtain a three-dimensional image of said object and said carrier from one or more of said obtained sub-images; and a calculating unit arranged to determine the presence and/or position of said object on said carrier from said three-dimensional image.

Still a further object of the present invention is to provide an improved system for distributing and/or sorting objects placed on carriers moving in a predetermined direction of movement in the system.

This object is achieved through providing a system which comprises:

at least one carrier moving in a predetermined direction of movement;

at least one apparatus for measuring the presence and/or position of an object placed on said carrier, which apparatus comprises:

at least one light source arranged to illuminate said object and said carrier with incident light;

at least one sensor placed on a predetermined distance from said at least one light source and arranged to repeatedly measure said object and said carrier by detecting reflected light from said object and said carrier when said carrier is moved in said direction of movement and to convert the detected light into electrical signals;

an image-processing unit arranged to use the electrical signals and obtain a three-dimensional sub-image of each of the measurements of said object and said carrier and to obtain a three-dimensional image of said object and said carrier from one or more of said obtained sub-images; and a calculating unit arranged to determine the presence and/or position of said object on said carrier from said three-dimensional image.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

In the following a preferred embodiment of an apparatus in a distribution system for measuring the presence, position and shape of an object placed on a carrier will be described.

Figure 1:
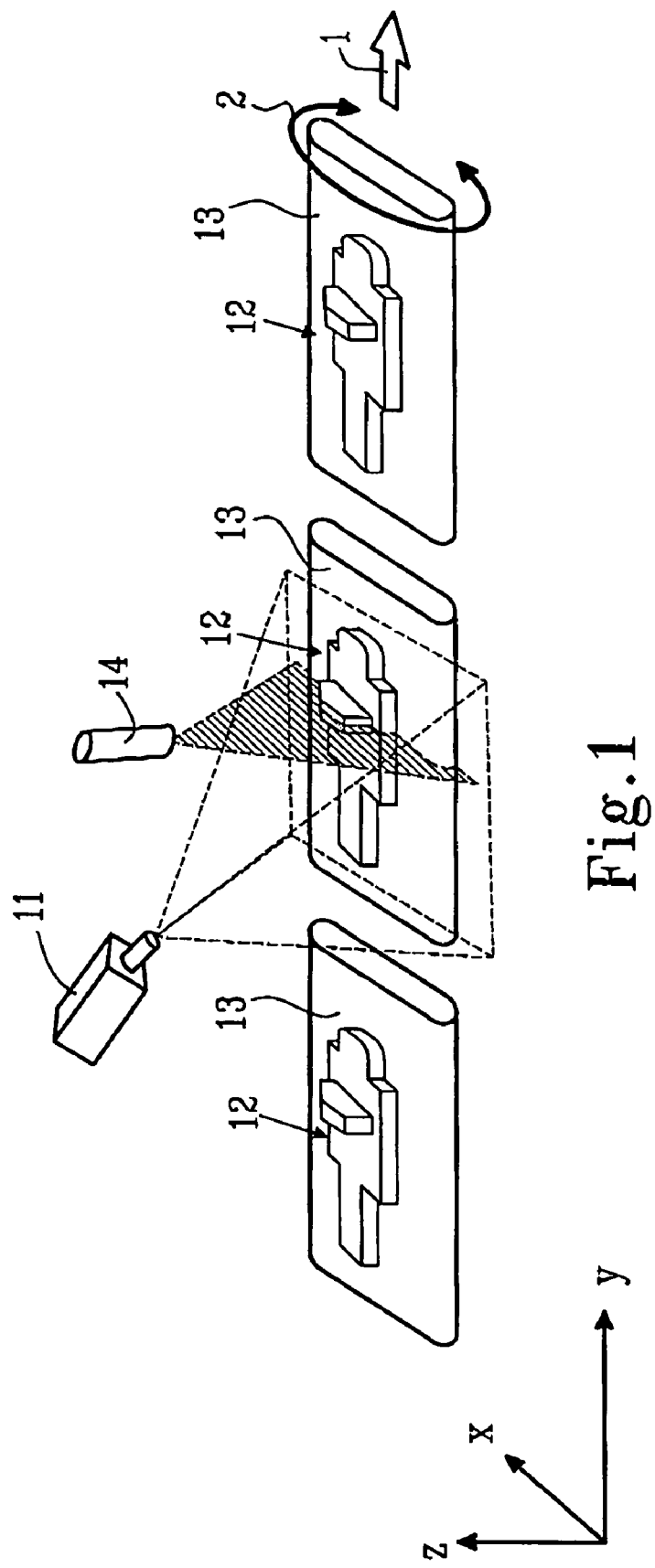
FIG. 1 illustrates schematically an apparatus for measuring presence, position and shape of an object placed on a carrier in a distribution system, according to a first embodiment of the invention.

FIG. 1 shows a first embodiment of an apparatus in a distribution system for measuring the presence and position of an object 12 placed on a carrier 13. The apparatus comprises one light source 14 arranged to illuminate the object 12 and the carrier 13 with incident light. The light source 14 generates a line of light across the object 12. At least one sensor 11 is arranged to detect the reflected light from the object 12 and the carrier 13 and to convert the detected light into electrical signals. An image/signal-processing unit (not shown) is arranged to create an analogue or digital representation of the illuminated cross-section of the object 12 and the carrier 13 according to the electrical signals. In the preferred embodiment of the present invention, a digital representation of the object 12 and carrier 13 is created. The apparatus further comprises a calculating unit (not shown) arranged to determine the presence and position of the object 12 and carrier 13 from the digital representation.

In the first embodiment of the present invention the carrier 13 moves relative the measuring apparatus in a predetermined direction of movement, denoted by arrow 1, shown in FIG. 1. The distribution system consists of a plurality of carriers 13 where each carrier 13 also is capable of moving in a direction that differs from the predetermined direction, preferably substantially orthogonal to the predetermined direction of movement, denoted by arrow 2, shown in FIG. 1.

Figure 5A:
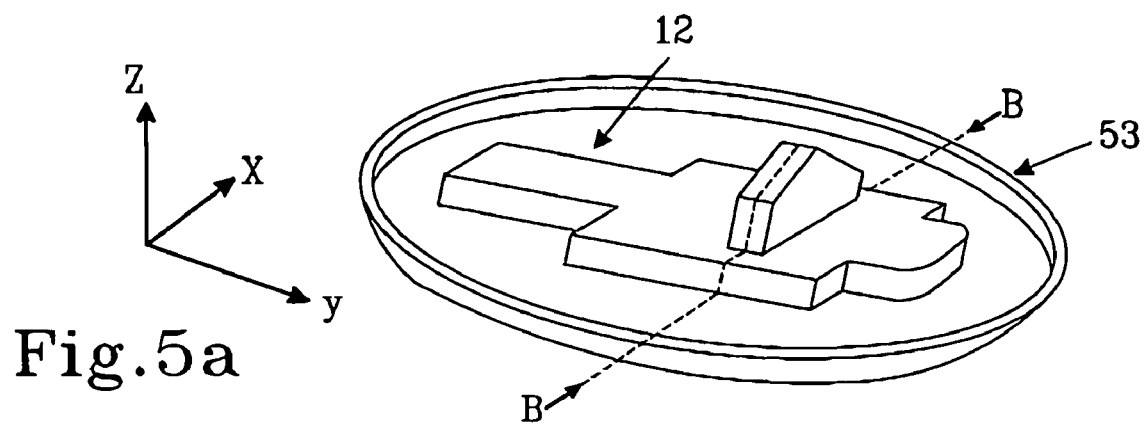
FIG. 5a illustrates a perspective view of an object placed on a carrier that is bowl-shaped.

The carrier 13 may be of any shape, for example flat-shaped, bowl-shaped or flat-shaped with edges. One example of a bowl-shaped carrier is shown in FIG. 5a, another type of a bowl-shaped carrier is a carrier having a U-shaped profile in a transversal direction (x-direction) but having a flat profile in the direction of movement (y-direction). Further the carrier may be a flip-tray, a cross-belt sorter, a conveyor, or the like.

The object 12 may be of any shape, size, material or color and may be placed anywhere on the carrier 13. Also, the object may have a size which covers more than one carrier. Or, alternatively, may be so small that there might be several objects placed on the same carrier.

The light source 14 generates structured light, for example, point light, linear light or light composed of multiple, substantially point or linear segments and may be of any type suitable for the application, for example a laser, a light-emitting diode (LED), ordinary light (light bulb) etc, which are familiar to the person skilled in the art and will not be described further herein. Laser light is preferably used in the preferred embodiment of the present invention.

The sensor 11 is placed on a predetermined distance from the light source 14. The sensor 11 may be a CCD camera, a CMOS camera or any other camera suitable for imaging characteristics of an object. The image/signal-processing unit may be integrated in the sensor 11, may be a separate unit provided in the same housing as the sensor 11 (in the camera housing), or may be a totally separate unit outside the camera housing. The sensor 11 is in the present system capable of detecting both two-dimensional (2D, intensity) and three-dimensional (3D, range) information, i.e. is capable of measuring both intensity distribution and geometric profile of the object 12. The information on geometric profile (3D shape) of the object 12 is obtained by using triangulation, i.e. the position of the reflected light on the sensor 11 indicates the distance from the sensor 11 to the object 12 when the light source 14 is placed on a predetermined distance from the sensor 11. The 2D information in itself helps in the detection of the object 12, but may also be used as a confidence measurement of the quality of the 3D data. Occasionally the sensor 11 do not detect any reflected light and this may be an indication of that an object is present. This phenomenon is called "missing data" and will be further described below.

The sensor 11 is arranged to detect 2D and 3D information of the object 12 and carrier 13 in a plurality of cross-sections of the object 12 and the carrier 13 illuminated by the light source 14, i.e. it is arranged to repeatedly measure (scan) the object 12 and the carrier 13 when the carrier 13 moves along in the direction of movement, in order to obtain a plurality of cross-section images (sub-images) which are put together into a measured 2D and/or 3D image of the object 12 and the carrier 13.

The apparatus further comprises a calculating unit (not shown) arranged to determine said measured image of the object 12 and the carrier 13. The apparatus is able to store reference images of different types of carriers, either by manually store a number of nominal different carrier shapes or by automatically teach the apparatus the shape of the carriers, which means that all types of carriers can be used and still the apparatus is capable of determining the shape of the object placed on the carrier, by comparing the stored reference image of the carrier in question with the measured image. Even the shape of a tilted and/or vibrating carrier can be handled by the apparatus, this is obtained by registering the measured image data with the shape and angle of the reference image and, thus, the true shape of the object can be determined. Also, in the same way, the calculating unit can be taught how the intensity and scatter (explained further below) is distributed in the carriers, whereby the measured intensity and scatter may be compared with the stored references. The calculating unit may be integrated in the sensor 11, may be a separate unit provided in the same housing as the sensor 11 (in the camera housing), or may be a totally separate unit outside the camera housing.

In a preferred embodiment of the present invention, the light source, the sensor, the image-processing unit and the calculating unit are all arranged within the same housing.

Occasionally the sensor does not detect any reflected light, this phenomenon is called "missing data". The cause of missing data may have two explanations; either the sensor will not detect any reflected light since the laser is occluded, which hereinafter will be called "occluded data" and will be described in further detail in conjunction to the description of FIGS. 2 and 3b, or the sensor will not detect any reflected light since the light is either absorbed or reflected away from the receiver, e.g. when the object has dark and/or very reflective color, which hereinafter will be called "lost data" and will be described in further detail in conjunction to the description of FIGS. 3c and 3d.

Figure 2:
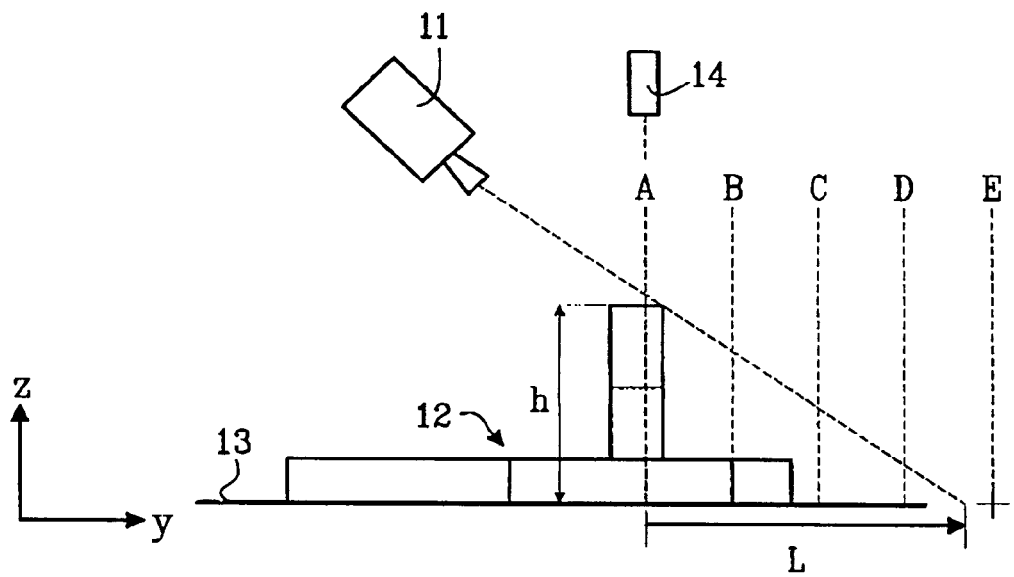
FIG. 2 illustrates the first embodiment of the present invention wherein an occluded area is formed where the sensor does not detect any reflected light.

FIG. 2 shows the first embodiment of the invention having one light source 14 and one sensor 11. When the light source 14 illuminates the object 12 there is formed an area where the sensor does not detect any reflected light, this results in missing data due to occlusion. Occluded data is an indication of that there is an object present on the carrier. This is illustrated in FIG. 2, the cross-sections in the points A–E are measured when the object moves through the setup. In B, C and D, shown in FIG. 2, the sensor 11 does not detect any reflected light, thus it is an area of occluded data. In E sensor 11 again detects reflected light. By knowing the length L of the occluded data area the apparatus is capable of calculating for example the height h of the object and this information may e.g. be used to verify the shape of the object 12.

Figure 3A:
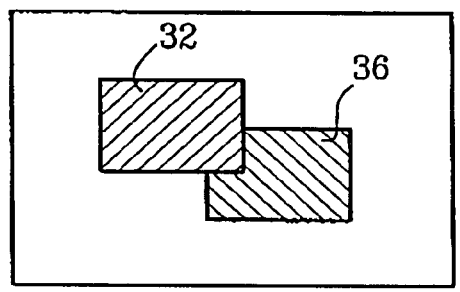
FIG. 3a illustrates a 2D intensity image of an object and a disturbing artifact.

FIG. 3a illustrates a 2D intensity image of an object 32 and a disturbing artifact 36. If the carrier is free from disturbing artifacts such as paint, dirt and stickers the 2D shape and position of the object may be extracted from the 2D image. However, in the example shown in FIG. 3a, there is an artifact on the carrier and, thus, correct information about the 2D shape and position of the object 32 is not possible to extract.

Figure 3B:
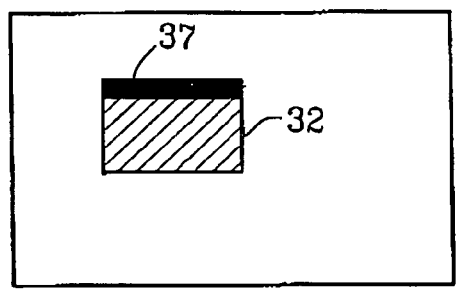
FIG. 3b illustrates a 3D range image of an object wherein a part of the object is occluded.

FIG. 3b illustrates a 3D range image of the same object 32 as in FIG. 2a wherein a part of the object is occluded 37, i.e. it is outside the FoV of the sensor. The apparatus may use the absence of 3D information in the object detection process as described in FIG. 2.

When using 3D image information most objects may be detected securely. However, for certain materials the 3D image acquisition does not give secure 3D information and the result is missing data. This is e.g. the case if the objects are very reflective or dark. Thus the best information of an objects presence, position and/or shape is obtained by using sensors capable of detecting both 2D and 3D information.

The 2D can help the detection and it can also be used as a confidence measurement of the quality of the 3D data.

Figure 3C:
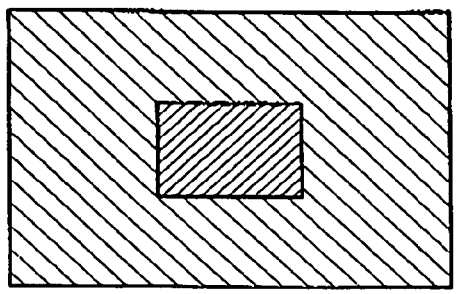
FIG. 3c illustrates a 2D image of a dark object placed on a dark carrier.
Figure 3D:
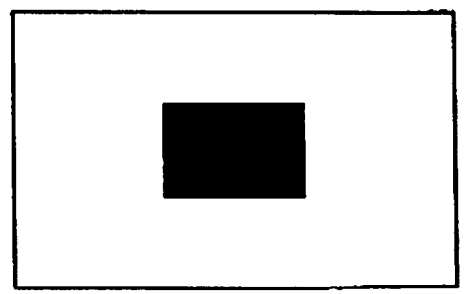
FIG. 3d illustrates the "lost data" phenomenon.

FIG. 3c and FIG. 3d illustrates the "lost data" phenomenon. In FIG. 3c the object and the carrier have similar dark color. If the sensor does not detect any reflected light of the object, such as when the light is reflected away from the receiver, this is an indication of that an object is present on the carrier and a position estimate is determined using this missing data.

Figure 4A:
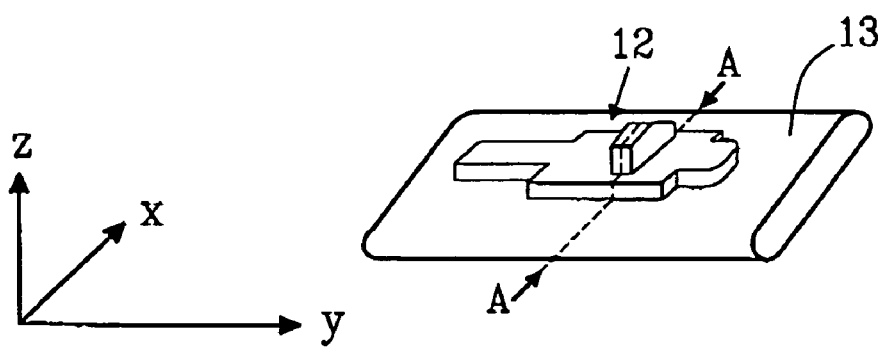
FIG. 4a illustrates a perspective view of an object placed on a flat carrier.

FIG. 4a shows a perspective view of the object 12 on the carrier 13, where the carrier is moving in the y-direction.

Figure 4B:
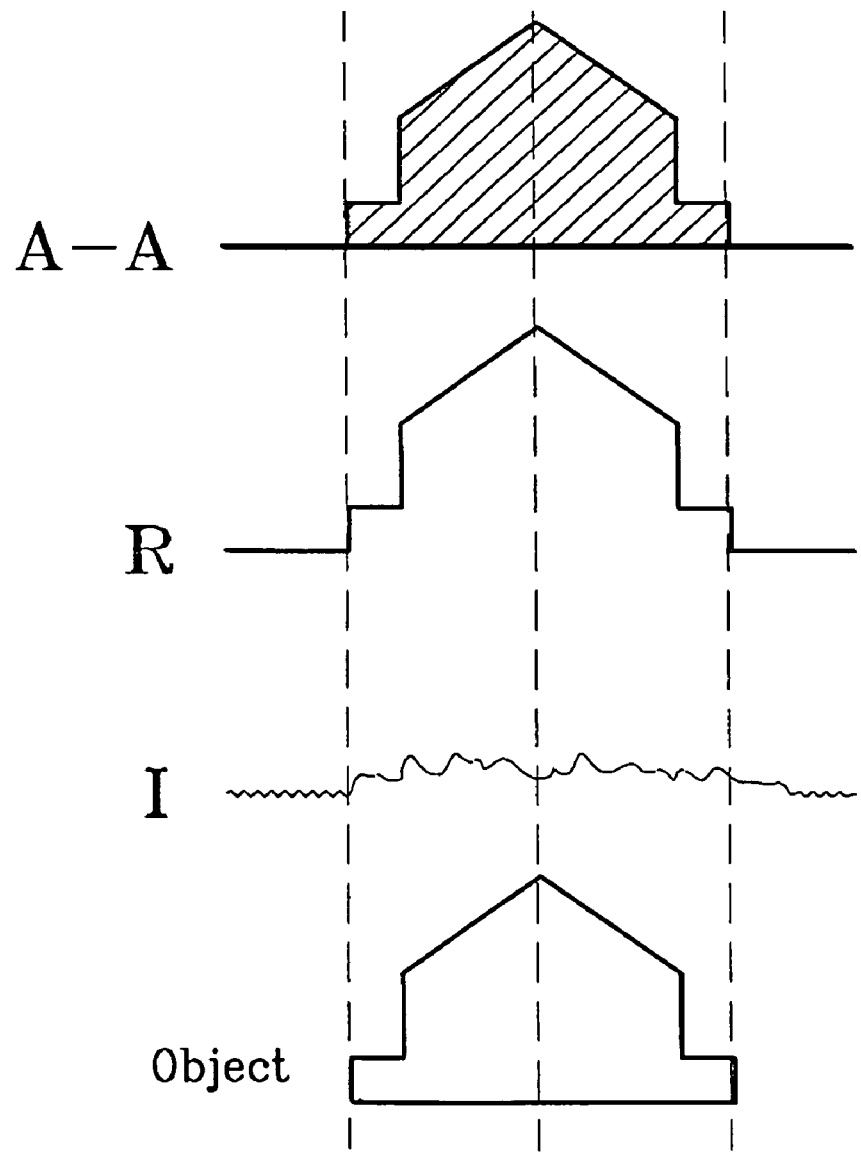
FIG. 4b illustrates the process of determining the presence, position and shape of an object placed on a flat carrier.

FIG. 4b illustrates the process of determining the presence, position and/or shape of a cross-section of the object 12. At the top is shown the cross-section A—A of the object 12, thus what is illuminated by the light source 14. R is the A—A cross-section 3D (range) image of the carrier 13 and the object 12 produced by the image-processing unit. I (intensity) indicates the measured intensity (2D) reflected from the cross-section A—A of the object 12. As seen in the figure the intensity modulation continues after the object, this is an indication of other artifacts present on the carrier for example dirt, paint or stickers. The last representation is the A—A cross-section 3D shape of the object determined by the calculating unit.

FIG. 5a shows a perspective view of a bowl-shaped carrier 53 in which the object 12 is placed. The carrier moves in the y-direction.

Figure 5B:
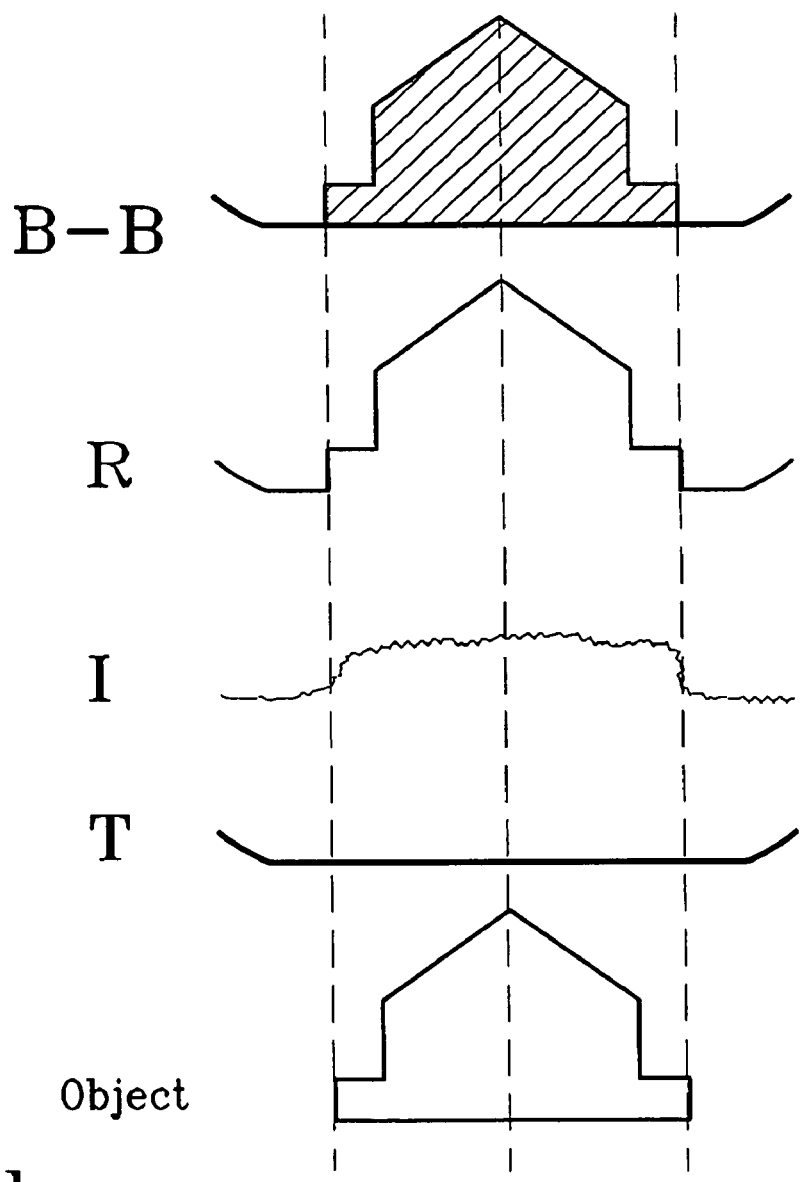
FIG. 5b illustrates the process of determining the presence, position and shape of an object placed on a bowl-shaped carrier.

FIG. 5b illustrates the process of determining the presence, position and shape of a cross-section of an object 12 placed in a bowl-shaped carrier 53. At the top is shown the cross-section B—B of the object 12, thus what is illuminated by the light source. R is the B—B cross-section 3D (range) image of the carrier 53 and the object 12 produced by the image-processing unit. I (intensity) indicates the measured intensity (2D) reflected from the cross-section B—B of the object 12. T shows the 3D cross-section reference image of the shape of the carrier learned by the apparatus. The last representation is the B—B cross-section 3D shape of the object determined by the calculating unit by subtracting T from R.

Figure 6A:
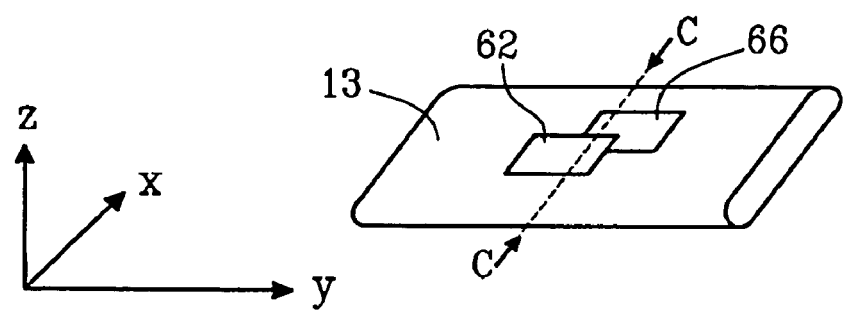
FIG. 6a illustrates a perspective view of an object having a very low profile (height) placed on a flat carrier.

FIG. 6a shows a perspective view of an object 62 having a very low profile (height) such as a credit card, a business card or the like. The object 62 is placed on a carrier 13 which moves in the y-direction. A disturbing artifact 66 such as paint, dirt or a sticker on the carrier 13 can also be seen in the figure.

Figure 6B:
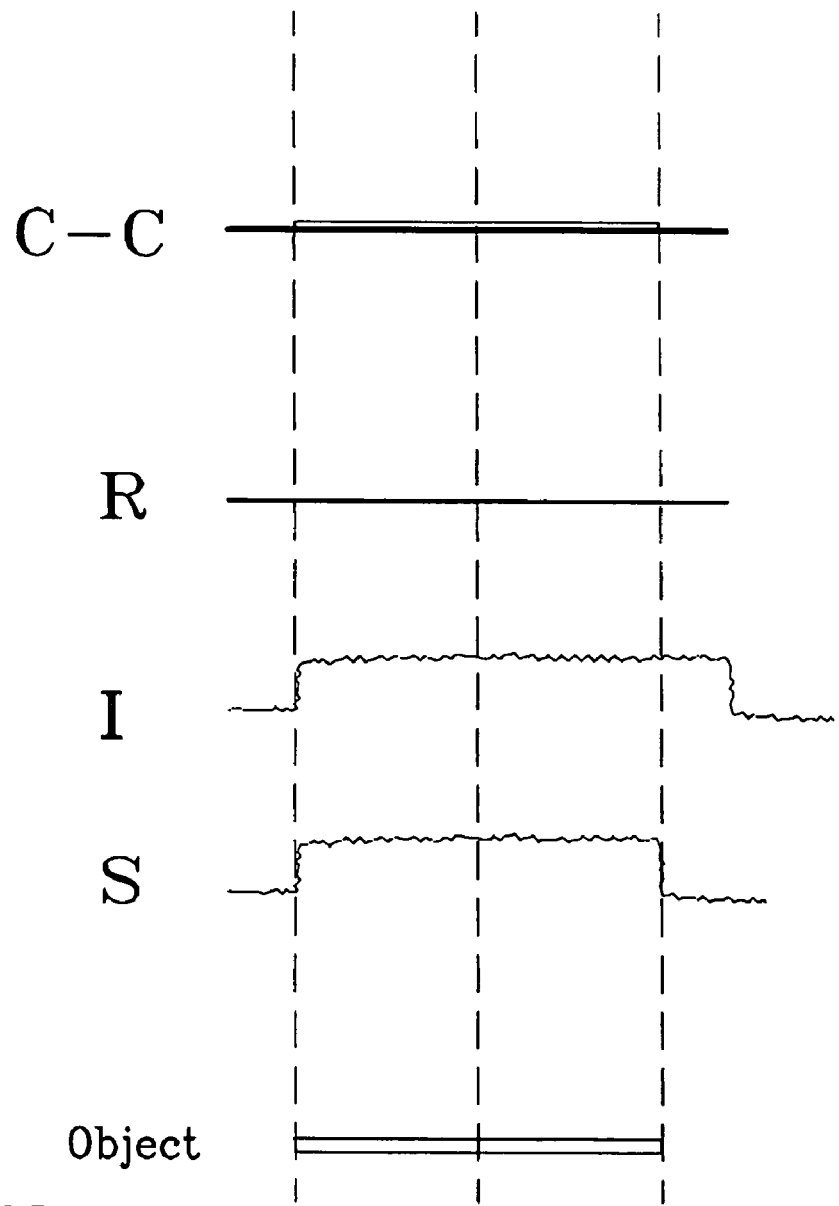
FIG. 6b illustrates the process of determining the presence and position of an object having a very low profile (height)

FIG. 6b illustrates the process of determining the presence and position of a cross-section of the object 62 on the carrier 13. At the top is shown the cross-section C—C of the object 62, thus what is illuminated by the light source. R is the C—C cross-section 3D (range) image of the carrier 13 and the object 62 produced by the image-processing unit. As can be seen from the figure, it is very difficult to read-out any information from this 3D image of the object 62 and the carrier 13 when the object 62 has a low profile. I (intensity) indicates the measured intensity (2D) reflected from the cross-section C—C of the object 62. Since there is some sort of artifact 66 on the carrier 13, the intensity modulation does not correctly identify the presence and position of the object 62. S (scatter) indicates the measured scattering of the incident light in the surface layer of the object 62. That is to say, the light penetrating the material of the object 62 and after scattering is registered when it emerges from the material at a different location from that at which it entered. How this occurs depend on the internal characteristics of the material. When the object 62 and the artifact 66 consist of different types of materials, the incident light scatters differently and, thus, the presence and/or position of the object 62 is in this example identified by measuring the scattered light. To measure scattered light is previously known from e.g. EP 765 471, which is hereby incorporated by reference.

The setup in FIGS. 1 through 6 comprises a single light source and a single sensor. It is however obvious for the person skilled in the art that more than one light source and sensor may be used. Multiple light sources illuminate the object in the same light plane and this reduces occlusion. Multiple sensors may give increased FoV and reduced occlusion.

Figure 7:
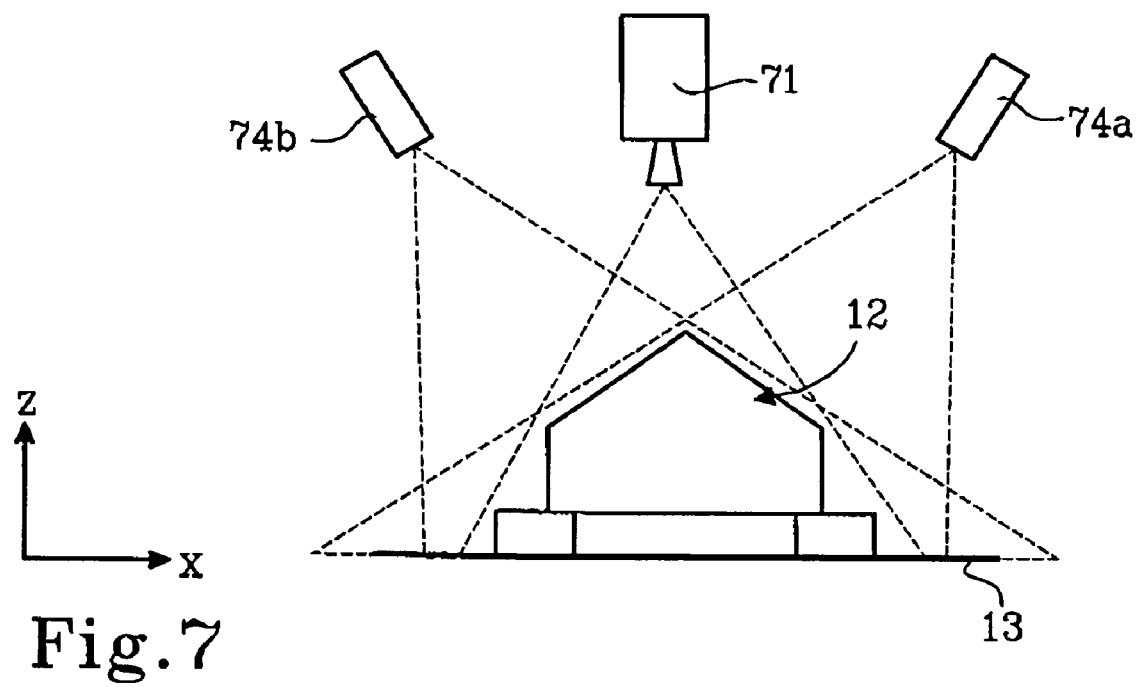
FIG. 7 illustrates schematically an alternative to the first embodiment of the apparatus according to the invention, wherein one sensor and two light sources are used.
Figure 8A:
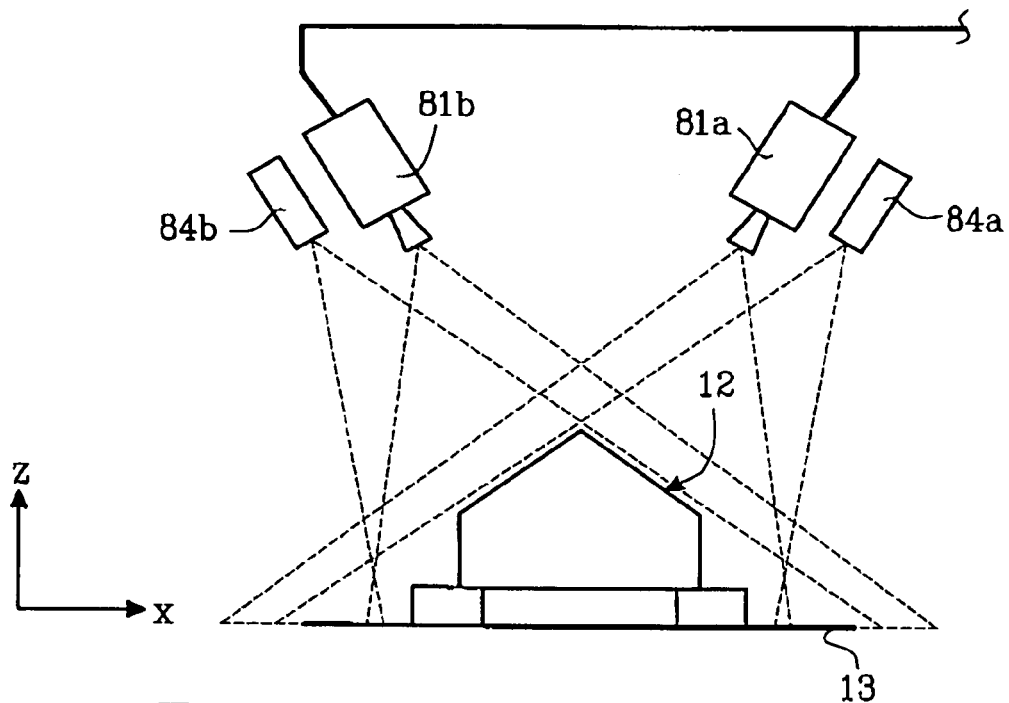
FIG. 8a illustrates schematically another alternative to the first embodiment of the apparatus according to the invention, wherein two sensors and two light sources are used.
Figure 8B:
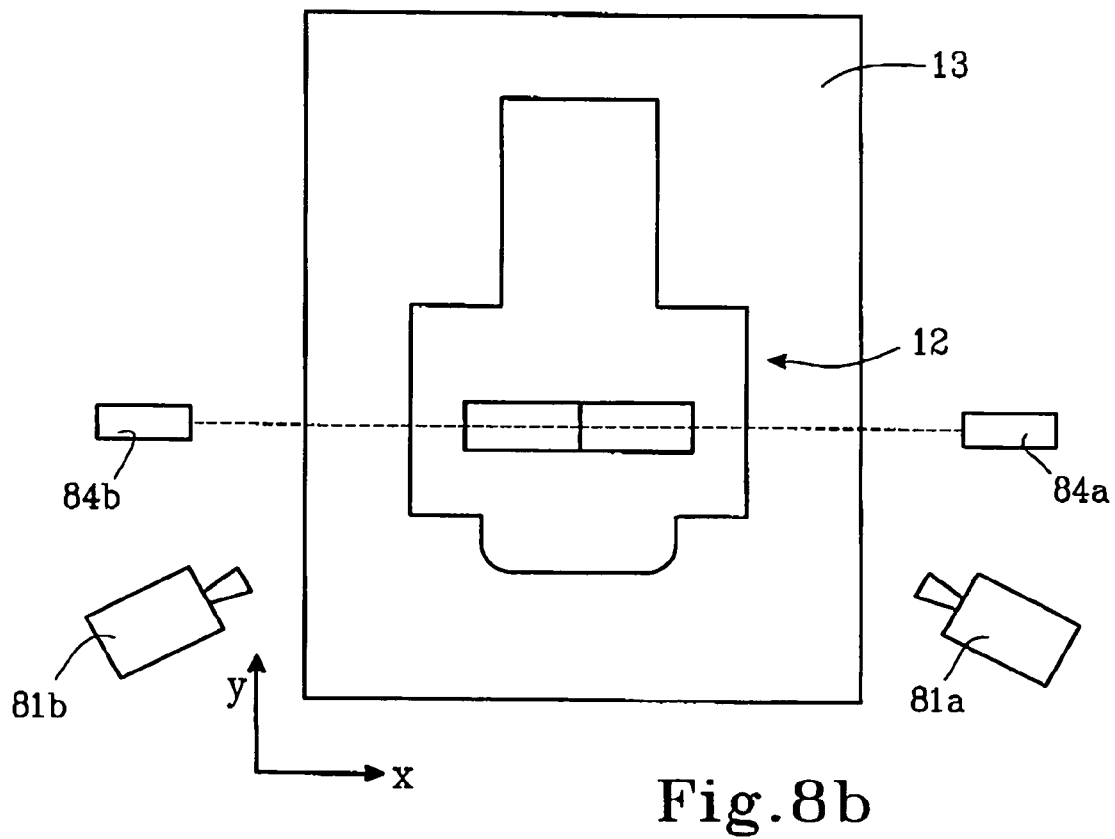
FIG. 8b illustrates the same embodiment as shown in FIG. 8a but seen from above.
Figure 9:
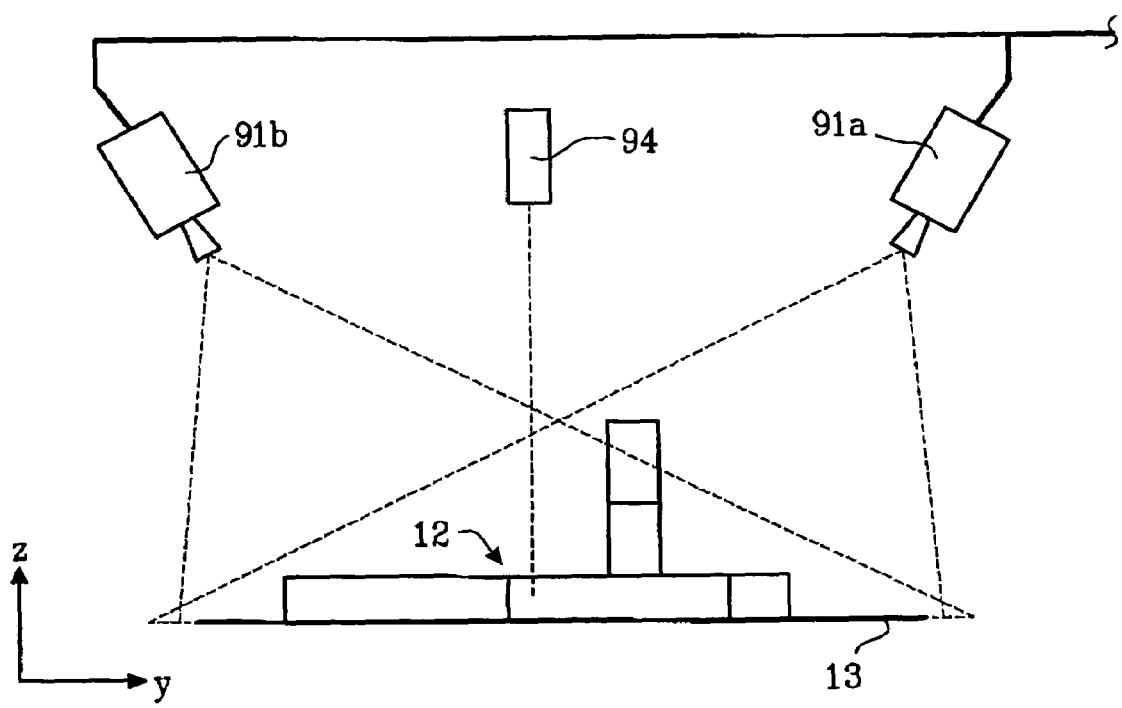
FIG. 9 illustrates schematically still another alternative to the first embodiment of the apparatus according to the invention, wherein one light source and two sensors are used.

FIGS. 7, 8 and 9 show alternative embodiments of the first embodiment. The alternative embodiments are described in more detail below.

FIG. 7 shows an alternative to the first embodiment of the apparatus according to the invention.

The apparatus comprises two light sources 74a, 74b arranged to illuminate the object 12 and the carrier 33 with incident light in the same light plane from different locations and angles. One sensor 71 is arranged to detect the reflected light from the object 12 and the carrier 13 in a plurality of cross-sections of the object 12 and the carrier 13 illuminated by the light sources 74a, 74b when the carrier 13 moves in the y-direction. The sensor 71 is further arranged to convert the detected light into electrical signals. At least one image/signal processing unit (not shown) is arranged to create an analogue or digital representation of the object and the carrier according to the electrical signals and thus obtain a plurality of sub-images, one for each measured cross-section, which are put together into a measured image of the object 12 and the carrier 13. At least one calculating unit (not shown) is arranged to determine the presence, position and shape of the object 12 from the measured image. The two light sources 74a, 74b are arranged on each side of the sensor 71 and on a predetermined distance from the sensor 71 and arranged to reduce occlusion.

FIG. 8a shows another alternative to the first embodiment of the apparatus according to the invention. The apparatus comprises a first and a second light source 84a, 84b are arranged to illuminate the object 12 and the carrier 13 with incident light in the same light plane from different locations and angles. The apparatus further comprises first and a second sensor 81a, 81b arranged to detect the reflected light from the object 12 and the carrier 13 in a plurality of cross-sections of the object 12 and the carrier 13 illuminated by the light sources 84a, 84b when the carrier 13 moves in the y-direction. The sensors 81a, 81b are further arranged to convert the detected light into electrical signals. At least one image/signal processing unit (not shown) is arranged to create an analogue or digital representation of the object 12 and the carrier 13 according to the electrical signals and thus obtain a plurality of sub-images, one for each measured cross-section, which are put together into a measured image of the object 12 and the carrier 13. At least one calculating unit (not shown) is arranged to determine the presence, position and shape of the object 12 from the measured image. The two sensors 81a, 81b are arranged on a predetermined distance from the two light sources 84a, 84b respectively, above the carrier 13 and on each side of the object 12 in the x-direction. The first and the second sensors 81a, 81b are arranged to extract information of partial views of the object/carrier cross-section, to minimize occlusion and/or to extend the FoV of each sensor to a larger combined FoV. It is seen from FIG. 8a that the combined FoV is larger than the FoV in FIG. 7 comprising one single sensor. The first and the second sensors 81a, 81b are connected to each other and the calculating unit (not shown) is arranged in one of the two sensors 81*a*, 81*b*. Alternatively, the calculating unit is arranged in a separate unit connected to the first 81*a* and the second 81*b* sensor.

FIG. 8*b* shows the same embodiment as in FIG. 8*a* but seen from above.

FIG. 9 shows still another alternative to the first embodiment of the apparatus according to the invention. The apparatus comprises one light source 94 arranged to illuminate the object 12 and the carrier 13 with incident light, and a first and a second sensor 91*a*, 91*b* arranged to detect the reflected light from the object 12 and the carrier 13 in a plurality of cross-sections of the object 12 and the carrier 13 illuminated by the light source 94 when the carrier 13 moves in the y-direction. The sensors 91*a*, 91*b* are further arranged to convert the detected light into electrical signals. At least one image/signal processing unit (not shown) is arranged to create an analogue or digital representation of the object 12 and the carrier 13 according to the electrical signals and thus obtain a plurality of sub-images, one for each measured cross-section, which are put together into a measured image of the object 12 and the carrier 13. At least one calculating unit (not shown) is arranged to determine the presence, position and shape of the object 12 from the measured image. The light source 94 is arranged above the object 12 in between the two sensors 91*a*, 91*b*. The first and the second sensors 91*a*, 91*b* are arranged on each side of the light source 94 in the movable direction of the carrier 13 and on a predetermined distance from the light source 94 and are arranged to extract information of partial views of the object/carrier cross-section, to minimize occlusion and missing data.

Figure 10:
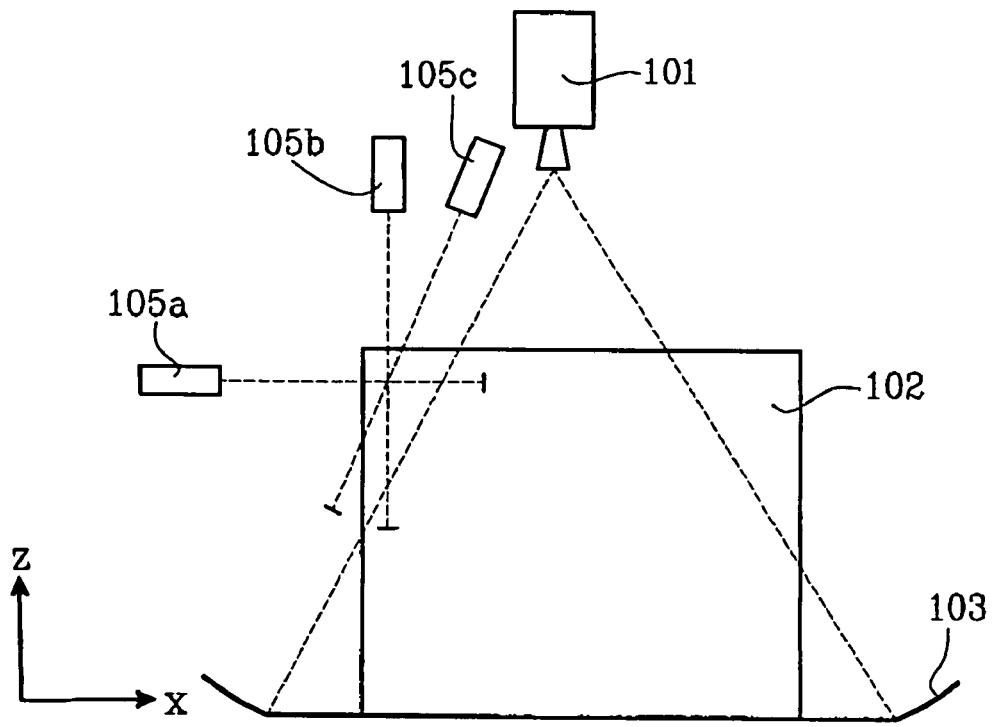
FIG. 10 illustrates schematically a second embodiment of the apparatus according to the invention, wherein additional detectors are arranged to detect if there is a large object present on the carrier.
Figure 11:
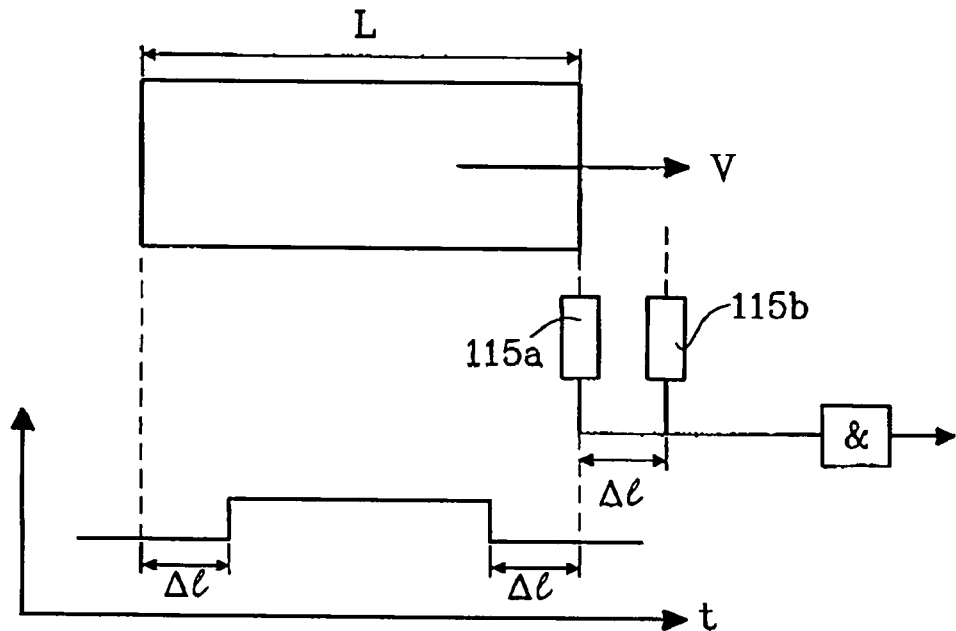
FIG. 11 illustrates schematically a third embodiment of the apparatus according to the invention wherein additional detectors are used to synchronize the acquisition with the motion of the carrier to be able to measure the position of the objects on the carriers.

FIG. 10 through 11 shows optional units that may be added to all the above described embodiments.

FIG. 10 shows a second embodiment of the apparatus according to the invention. The apparatus comprises a light source 104 arranged to illuminate the object 102 and the carrier 103 with incident light. A sensor 101 is arranged to detect the reflected light from the object 102 and the carrier 103 in a plurality of cross-sections of the object 102 and the carrier 103 illuminated by the light source 104 when the carrier 103 moves in the y-direction and, to convert the detected light into electrical signals. At least one image/signal processing unit (not shown) is arranged to create an analogue or digital representation of the object 102 and the carrier 103 according to the electrical signals and thus obtain a plurality of sub-images, one for each measured cross-section, which are put together into a measured image of the object 102 and the carrier 103. At least one calculating unit (not shown) is arranged to determine the presence, position and shape of the object 102 from the measured image. At least one additional detector 105*a–c* is arranged to detect if there is an object 102 present on the carrier 103 at a position outside the FoV of the sensor 101. In the embodiment shown in FIG. 10, three detectors 105*a–c* are used. The detectors 105*a–c* may be point detectors, photo switches, photo sensors or any other detector suitable for the detection of the presence and/or position of objects. If large objects 102 are transported on the carrier 103 it sometimes is difficult for the sensor 101 to view the entire object 102, i.e. the object 102 is larger than the FoV of the sensor 101. This problem may be solved by using more than one sensor but sometimes it is more cost efficient to use one or more detectors 105*a–c*. The detectors 105*a–c* may be arranged anywhere above the carrier 103 so that a measurement optimized for the current application is performed.

FIG. 11 shows a third embodiment of the apparatus according to the invention. The apparatus comprises at least one light source arranged to illuminate the object on the carrier. At least one sensor is arranged to detect the reflected light from the object and the carrier in a plurality of cross-sections of the object 102 and the carrier 103 illuminated by the light source 104 when the carrier 103 moves in the y-direction and, to convert the detected light into electrical signals. At least one image/signal processing unit is arranged to create an analogue or digital representation of the object and the carrier according to the electrical signals and thus obtain a plurality of sub-images, one for each measured cross-section, which are put together into a measured image of the object and the carrier. At least one calculating unit is arranged to determine the presence and position of the object from the measured image. At least two detectors 115*a*, 115*b* are arranged to give a signal when the carrier passes through the beams of light of the detectors 115*a*, 115*b*.

The detectors may be point detectors, photo switches, photo sensors or any other detector suitable for the measurement. The object of using the detectors is to synchronize the acquisition with the motion of the carrier and thereby avoid to measure parts on the carrier where no relevant information is expected. The at least two detectors are arranged on one side of the carrier and substantially orthogonal to the direction of movement. The carrier moves along the predetermined direction and passes the first and the second detector, the apparatus then gets a trigger signal. In the shown embodiment, two detectors are shown. The person skilled in the art realizes, however, that the use of more than two detectors may have certain advantages, e.g. to prevent a false trigger signal in the case when the space between the carriers are narrower than the parts ($\Delta l$ in the figure) of the carriers where no relevant information is expected.

By knowing the distances L and $\Delta l$, shown in the figure, and the time $\Delta t$ that elapse between each sample of the sensor the apparatus can calculate the distance $\Delta x$ between each sample and thus is able to extract the required information, i.e. is able to measure the position of the objects on the carriers (when the speed of the carriers are constant).

Alternatively, instead of calculating the distance $\Delta x$ using the distances L and $\Delta l$, a motion detector is used to synchronize the acquisition with the motion of the carrier to be able to measure the position of the objects on the carriers. The motion detector feeds pulses when the carrier moves along in the direction of movement, which are received by the sensor and/or the calculating unit.

In the following will be described a method for measuring the presence and/or position of an object placed on a carrier moving in a predetermined direction of movement in a distribution system, comprising the steps of: illuminating said object and said carrier with incident light by at least one light source; repeatedly measuring said object and said carrier by detecting reflected light from said object and said carrier when said carrier is moved in said direction of movement using at least one sensor, which is placed with a predetermined distance from said at least one light source; converting the detected light into electrical signals; obtaining a three-dimensional sub-image of said object and said carrier from each measurement of said object and said carrier using said electrical signals; obtaining a three-dimensional image of said object and said carrier from one or more of said obtained sub-images; and, determining the presence and position of said object on said carrier from said three-dimensional image.

In a further embodiment the method further comprises the step of determining the intensity distribution of the reflected light from said object.

In a yet further embodiment the method comprises the step of determining the three-dimensional shape of said object from said three-dimensional image.

In a still further embodiment the method further comprises the step of comparing said three-dimensional image with a reference image of the shape of said carrier, wherein the reference image is either manually or automatically stored in a calculation unit.

In another embodiment the method comprises the step of measuring light scattered in said object in order to determine the presence and position of said object.

In an additional further embodiment the method comprises the step of providing a carrier which further is movable in another direction different from the predetermined direction of movement, whereby the position of said object on the carrier is adjusted when the determined position of said object is outside a predetermined position area on said carrier.

In a yet further embodiment the method comprises the step of reducing occlusion by using at least two light sources, which illuminate said object and said carrier in the same light plane In a still further embodiment the method comprises the step of reducing occlusion by using at least two sensors, which view said object and said carrier from different locations.

In a yet additional further embodiment the method further comprises the step of calculating the maximum height of said object by using occluded data obtained if no reflected light is detected by said at least one sensor.

In a still further embodiment the method further comprises the step of optimizing the measuring of the presence and position of said object by using at least one detector, which is measuring outside a field of view of said at least one sensor.

In an additional further embodiment the method further comprises the step of synchronizing the measuring of the position of said object with the carrier movement by using at least one detector, wherein the synchronization is obtained either by using a motion detector feeding pulses when said carrier is moving in the direction of movement or by using at least two detectors, which are providing a trigger signal when the carrier is in a measuring position.

In a yet further embodiment the method comprises the step of measuring the shape of said object by using triangulation.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. Method for measuring the presence and/or position of an object placed on a carrier moving in a predetermined direction of movement in a distribution system, comprising the steps of:

illuminating said object and said carrier with incident light by at least one light source;

repeatedly measuring said object and said carrier by detecting reflected light from said object and said carrier when said carrier is moved in said direction of movement using at least one sensor, which is placed with a predetermined distance from said at least one light source;

converting the detected light into electrical signals;

obtaining a three-dimensional sub-image of said object and said carrier from each measurement of said object and said carrier using said electrical signals;

obtaining a three-dimensional image of said object and said carrier from one or more of said obtained sub-images; and determining the presence and/or position of said object on said carrier from said three-dimensional image.

2. Method according to claim 1, further comprising the step of determining the intensity distribution of the reflected light from said object.

3. Method according to claim 1, further comprising the step of determining the three-dimensional shape of said object from said three-dimensional image.

4. Method according to claim 1, wherein the step of determining the presence, position and/or three-dimensional shape of said object comprises the step of comparing said three-dimensional image with a reference image of the shape of said carrier.

5. Method according to claim 4, wherein said reference image is manually stored in a calculation unit.

6. Method according to claim 4, wherein said reference image is automatically stored in a calculation unit, which unit automatically is taught the shape of said carrier.

7. Method according to claim 1, further comprising the step of measuring light scattered in said object.

8. Method according to claim 1, wherein the carrier further is movable in another direction different from the predetermined direction of movement, whereby the position of said object on the carrier is adjusted when the determined position of said object is outside a predetermined position area on said carrier.

9. Method according to claim 1, further comprising the step of reducing occlusion by using at least two light sources, which illuminate said object and said carrier in the same light plane.

10. Method according to claim 1, further comprising the step of reducing occlusion by using at least two sensors, which view said object and said carrier from different locations.

11. Method according to claim 1, wherein the position of said object is calculated by using missing data obtained if no reflected light is detected by said at least one sensor.

12. Method according to claim 1, further comprising the step of optimizing the measuring of the presence and position of said object by using at least one detector, which is measuring outside a field of view of said at least one sensor.

13. Method according to claim 1, further comprising the step of synchronizing the measuring of said object with the carrier movement by using at least one detector.

14. Method according to claim 13, wherein the synchronization is obtained by using a motion detector feeding pulses when said carrier is moving in the direction of movement.

15. Method according to claim 13, wherein the synchronization is obtained by using at least two detectors, which are providing a trigger signal when the carrier is in a measuring position.

16. Method according to claim 1, wherein the shape measurement is done by using triangulation.

17. Apparatus for measuring the presence and/or position of an object placed on a carrier moving in a predetermined direction of movement in a distribution system, which apparatus comprises:
- at least one light source arranged to illuminate said object and said carrier with incident light;
- at least one sensor placed on a predetermined distance from said at least one light source and arranged to repeatedly measure said object and said carrier by detecting reflected light from said object and said carrier when said carrier is moved in said direction of movement and to convert the detected light into electrical signals;
- an image-processing unit arranged to use the electrical signals and obtain a three-dimensional sub-image of each of the measurements of said object and said carrier and to obtain a three-dimensional image of said object and said carrier from one or more of said obtained sub-images; and
- a calculating unit arranged to determine the presence and/or position of said object on said carrier from said three-dimensional image.

18. Apparatus according to claim 17, wherein the calculating unit further is arranged to determine the intensity distribution of the reflected light from said object.

19. Apparatus according to claim 17, wherein the calculating unit further is arranged to determine the three-dimensional shape of said object from said three-dimensional image.

20. Apparatus according to claim 19, wherein the calculating unit is arranged to compare said three-dimensional image with a reference image of the shape of said carrier.

21. Apparatus according to claim 20, wherein said reference image is manually stored in said calculating unit.

22. Apparatus according to claim 20, wherein said calculating unit is arranged to automatically learn the shape of said carrier.

23. Apparatus according to claim 17, wherein said sensor further is arranged to measure light scattered in said object.

24. Apparatus according to claim 17, wherein the light source is a laser light.

25. Apparatus according to claim 17, wherein the light source is arranged to generate one of the following lights: linear light, point light or light composed of multiple substantially point or linear segments.

26. Apparatus according to claim 17, comprising two light sources and one sensor wherein the two light sources are arranged on each side of said sensor and on a predetermined distance from said sensor, wherein the two light sources are arranged to illuminate said object and said carrier in the same light plane and to reduce occlusion.

27. Apparatus according to claim 17, comprising a first and a second sensor and a first and a second light source, wherein said first and said second sensor are connected to each other and wherein said calculating unit is arranged in one of the two sensors.

28. Apparatus according to claim 17, comprising a first and a second sensor and a first and a second light source, wherein said first and said second sensor are connected to each other and wherein said calculating unit is arranged as a separate unit connected to said two sensors.

29. Apparatus according to claim 17, wherein the apparatus comprises a first and a second sensor and one light source, wherein the light source is arranged above the object in between the two sensors and where said first and said second sensor are arranged on each side of the light source in said direction of movement of said carrier on a predetermined distance from said light source and arranged to reduce occlusion.

30. Apparatus according to claim 29, wherein said first and said second sensor are connected to each other and wherein said calculating unit is arranged in one of the two sensors.

31. Apparatus according to claim 29, wherein said first and said second sensor are connected to each other and wherein said calculating unit is arranged as a separate unit connected to said two sensors.

32. Apparatus according to claim 17, wherein said light source and said sensor are arranged within one housing.

33. Apparatus according to claim 32, wherein said calculating unit also is arranged within said housing.

34. Apparatus according to claim 17, further comprising at least one detector arranged to measure outside a field of view of said at least one sensor and arranged to optimize the measuring of the presence and the position of said object.

35. Apparatus according to claim 34, wherein said at least one detector is one of the following: a point detector, a photo switch or a photo sensor.

36. Apparatus according to claim 17, further comprising at least one detector arranged to synchronize the measuring of said object with the carrier movement.

37. Apparatus according to claim 36, wherein a motion detector is used to synchronize the measuring of the position of said object with the carrier movement and arranged to feed pulses towards said object when said carrier is moving in the direction of movement.

38. Apparatus according to claim 36, comprising at least two detectors arranged to obtain said synchronization by providing a trigger signal when said carrier is in a measuring position.

39. Apparatus according to claim 38, wherein said at least two detectors are one of the following: point detectors, photo switches or photo sensors.

40. System for distributing and/or sorting objects, which system comprises:
- at least one carrier moving in a predetermined direction of movement;
- at least one apparatus for measuring the presence and/or position of an object placed on said carrier, which apparatus comprises:
- at least one light source arranged to illuminate said object and said carrier with incident light;
- at least one sensor placed on a predetermined distance from said at least one light source and arranged to repeatedly measure said object and said carrier by detecting reflected light from said object and said carrier when said carrier is moved in said direction of movement and to convert the detected light into electrical signals;
- an image-processing unit arranged to use the electrical signals and obtain a three-dimensional sub-image of each of the measurements of said object and said carrier and to obtain a three-dimensional image of said object and said carrier from one or more of said obtained sub-images; and a calculating unit arranged to determine the presence and/or position of said object on said carrier from said three-dimensional image.

41. System according to claim 40, wherein the carrier further is arranged to move in another direction different from the predetermined direction of movement and to adjust the position of said object on the carrier when the deter mined position of said object is outside a predetermined position area on said carrier.

42. System according to claim 40, wherein the carrier is one of the following: a flip-tray, a belt sorter, a cross-belt tray or a conveyor.

43. System according to claim 40, wherein said carrier has one of the following shapes: bowl-shape, flat-shape or flat-shape with edges.

* * * * *